United States Patent [19]

DiBiasi et al.

[11] 4,360,486

[45] Nov. 23, 1982

[54] PROCESS FOR INTRODUCING AN ADDITIVE MATERIAL TO POLYMERIC FOAMS

[75] Inventors: Daniel J. DiBiasi; Charles M. Krutchen, both of Pittsford, N.Y.

[73] Assignee: Mobil Oil Corporation, New York, N.Y.

[21] Appl. No.: 320,024

[22] Filed: Nov. 10, 1981

[51] Int. Cl.³ ............................................. B29D 27/00
[52] U.S. Cl. ........................................ 264/37; 264/53; 264/211; 264/321; 264/DIG. 69; 264/DIG. 5; 521/79; 521/81; 521/139; 521/146
[58] Field of Search .................. 521/79, 81, 139, 146; 264/53, 37, 211, 321, DIG. 69

[56] References Cited

U.S. PATENT DOCUMENTS

| | | | |
|---|---|---|---|
| 3,940,325 | 2/1976 | Hirao | 204/159.20 |
| 4,038,250 | 7/1977 | Lind | 260/45.85 B |
| 4,136,142 | 1/1979 | Hargreaves et al. | 264/53 |
| 4,206,111 | 6/1980 | Valdiserri et al. | 260/45.8 NT |

*Primary Examiner*—Morton Foelak
*Attorney, Agent, or Firm*—Charles A. Huggett; James F. Powers, Jr.; James P. O'Sullivan, Sr.

[57] ABSTRACT

Improved polymeric foams are obtained by the introduction of a beneficial additive to the system by dissolving said additive into a liquid foaming agent which is a solvent therefor, combining the solution with the polymer and extruding the polymer in foamed form.

9 Claims, No Drawings

PROCESS FOR INTRODUCING AN ADDITIVE MATERIAL TO POLYMERIC FOAMS

FIELD OF THE INVENTION

This invention relates to the extrusion of foamed polymer compositions and more particularly to the extrusion of stabilized polymeric foam compositions of improved resistance to oxidative degradations.

BACKGROUND OF THE PRESENT INVENTION

It is common knowledge that foamed polymers are susceptible to various forms of degradation, for example, degradation due to the effect of oxygen and heat acting deleteriously on the polymer chains.

In its homopolymeric form, polystyrene, which contains no reinforcing polymeric materials such as rubber, is termed crystal polystyrene. This material is normally a transparent colorless resin used for making injection molded articles and films. This material is also used in the manufacture of expanded thermoplastic polystyrene foams by the use of a blowing agent such as a hydrocarbon or a chloro-fluorocarbon compound, under conditions causing vaporization of the blowing agent during extrusion of the polymer. During production of thermoformed articles from extruded foam polystyrene sheet, thermal oxidative degradation of polystyrene can occur to an extent having an adverse effect on the physical properties of the thermoformed articles.

DESCRIPTION OF THE PRIOR ART

The literature is replete with work done on antioxidant, stabilizer systems for use with polymers where oxidative degradation has an adverse affect on the physical properties of the formed finished article. Thus, it is common practice for the polymer supplier to introduce beneficial additives, such as, inhibitor materials, into the system during preparation of the polymer. For instance, it is common practice to introduce antioxidants into the monomer starting materials prior to polymerization so that the antioxidant material will be intimately involved in the finished polymer product. A wide variety of different types of antioxidants, for example, hindered phenols and phenolic esters, amine compounds, thioethers, organic phosphates, etc. have been proposed for this purpose. When the end user receives the polymer he has little control over the amount of inhibitor present particularly when consideration has to be given to the incorporation of a significant quantity of recycle polymer into his process. This recycle quantity causes, in effect, a dilution of the inhibitor present in the polymer received from the supplier and loss of control of the precise amount of inhibitor is experienced.

SUMMARY OF THE INVENTION

It is an object of the present invention to provide a novel method for extruding foamed stabilized polymers. It is a further object of the invention to provide a process for preparing foamed, expanded polystyrene sheet having enhanced protection against thermal oxidative degradation. It is yet another object of the invention to provide a process for preparing expanded polystyrene polymer having ultimate control over the amount of inhibitor material present in the foamed sheet. It is still another object of the invention to provide a process for the introduction of an additive to a foamable polymer just prior to foam sheet formation.

According to the present invention, a process is provided for introduction of an additive material to a foamable polymer comprising: dissolving the additive material into a liquid foaming agent; combining a molten foamable polymer with the additive-foaming agent solution; intimately mixing the combination; and extruding the polymer in foamed street form.

DESCRIPTION OF THE PREFERRED EMBODIMENTS

While the present invention is directed broadly to any polymer which can be foam extruded, for purposes of illustration the process will be described using polystyrene. The compositions of the present invention are particularly useful for making thermoformed, foamed polymer articles.

The process in general involves introducing the polystyrene in pellet form in admixture with a nucleating agent and heating the same to a relatively high temperature, e.g., 400°–550° F. in an extruder. A blowing agent, for example, a low molecular weight material, such as, pentane or a Freon, i.e. a chloro-fluorocarbon, is pumped into the extruder and thoroughly mixed with the molten polystyrene. Thereafter, the molten polystyrene, with the blowing agent homogeneously present is transported into a cooler second stage of the extruder or to a second extruder where the temperature is reduced to, for example 230°–315° F. At this temperature, the material is extruded through a die, normally an annular die. Immediately after exit through the die, the blowing agent volatilizes within the resin to cause expansion of the resin to form a foam structure. Then the extruded, expanded material is slit, formed into rolls, and aged for a period of time, for example, 1 to 3 days, following which, articles are made from the expanded sheet by hot forming.

In the process of the present invention, by way of illustration, an antioxidant material is selected which is an effective antioxidant for the polystyrene and which is soluble in the liquid blowing agent for the polystyrene. A solution of the antioxidant and liquid blowing agent is prepared. Thereafter, when the blowing agent-antioxidant solution is introduced into the system, the molten polystyrene and the foaming agent antioxidant solution are intimately mixed. As the polymer exits from the die and the blowing agent volatilizes within the polymer to cause expansion of the resin to form the foam sheet structure, the antioxidant remains intimately present throughout the polystyrene. By this technique the film and article manufacturer has ultimate control over the introduction of additives, such as antioxidants. This control includes not only the amount of antioxidant present in the system but includes the freedom of choice of effective but far less expensive antioxidant materials than would be available to a polymer manufacturer-supplier.

Because of the conditions of temperature and pressure necessary during the formation of a polymer by the manufacturer, the manufacturer finds it necessary to use comparatively high molecular weight antioxidants which have less of a tendency to flash off or volatilize during extrusion of the polymer as the manufacturer is forming the polymer in pellet form, as it is commonly supplied. This is true of many of the additives introduced during polymer formation. Thus, because of necessary process conditions, the supplier must employ a more expensive antioxidant or other additive and this cost is passed on to the article manufacturer and ultimately to the consumer.

By the process of the present invention, one significant advantage is the ability to use comparatively low molecular weight additive materials since the extrusion temperatures are considerably less and the apportunity for these low molecular weight materials to volatilize is minimized.

The present process also permits greater control of the effective amount of an antioxidant present in the system in spite of the use of recycle material. After articles are thermoformed from the foamed sheets, economic considerations dictate that the remaining scrap material be recycled through the process. For this purpose, the scrap foam material is fed to a recycle extruder where it is processed at temperatures in the 400° to 550° F. range for a substantial period of time to reduce it to the non-foam form. On exit from the recycle extruder, the material is chopped into pellets, which can then be mixed with virgin polystyrene pellets and thereby economically reenter the process. If the recycle material had already included in it an antioxidant material from the supplier of the polymer, it is more than likely that the antioxidant would lose effectiveness since it had been exposed to air from the atmosphere during aging of the foamed sheet and fairly high, prolonged temperature during recycle. Thus, if this material were introduced into polymer material containing antioxidant introduced by the supplier, the net result would be dilution to an unknown or uncertain level of the antioxidant material. Much of the antioxidant in the recycled material is considered spent and effectively not present. This is a disadvantageous loss of control.

By the present invention, since a known amount of antioxidant material is metered into the system as a solution in the blowing agent, eminently fascile control over the kind and amount of antioxidant or other material is accomplished.

It is to be understood that a mixed blowing agent solvent system can be employed in order to effect introduction of the additive material. Methylene chloride is an ideal solvent and blowing agent for many antioxidant materials particularly those of the hindered phenol type. Thus, instead of dissolving the antioxidant directly in a blowing agent such as pentane, the antioxidant can be first dissolved in methylene chloride and used as such, or blended with another blowing agent and the combination introduced into the system at a point just before the homogeneous process mass is moved to the second stage of the extrusion system.

The present invention thus provides in its broadest sense, a technique for utilizing lower cost, readily available bulk polymerized starting material in the manufacture of expanded sheets and thermoformed goods of high quality. In addition to polystyrene, any foamable polymer can be employed advantageously with the process of the present invention. Other polymers include polyparamethylstyrene, blends of polystyrene and polyphenylene oxide, maleic anhydride/styrene copolymers, any polyolefin capable of being foamed, etc. Non-limiting examples of foaming agents include low molecular weight hydrocarbons such as butane, normal pentane or isopentane, methylene chloride etc. In short, any blowing agent which, in its liquid form, is an effective solvent for the additive to be introduced into the molten polymer is contemplated. Additives, in addition to antioxidants, include light protecting agents for protecting light sensitive polymers, for example hydroxy benzoic acid aryl esters; lubricant additives to aid in the extrusion of the polymer, for example stearic acid and any of its soluble metal salts; surfactants, such as block copolymers of propylene oxide and ethylene oxide, isopropyl lanolate, lanoline oil, etc. Specific examples of antioxidants include hindered phenols, for example, butylated hydroxy toluene, more specifically 2,6-di-tert-butyl-p-cresol; octadecyl 3-(3',5'-di-tert-butyl-4'-hydroxy phenyl)propionate. Other classes of antioxidants include sulfides, thioethers, organic phosphates and phosphites, amine compounds, etc.

The antioxidant, of course, should be present in an antioxidant effective amount. Generally, this will be found to be within the range of from about 10 to about 1,000 parts per million, preferably 100 to about 500 parts per million, based on the weight of the polymer.

EXAMPLE 1

(Control)

Using polystyrene of known molecular weight, foam extruded polystyrene was prepared using a commercial scale foam extrusion apparatus. The apparatus employed in the process comprised a main extruder having a first mixing and melting stage heated to approximately 450° F. and a second stage fed from the first stage which cools the melt to approximately 300° F. The main extruder was changed with commercially available virgin polystyrene free of any antioxidant. A sodium bicarbonate/citric acid nucleating agent combination was included with the polystyrene and it was brought to its molten state. Isopentane foaming agent was fed to the molten material under pressure in a primary extruder and the isopentane and polystyrene was transferred to a secondary cooling extruder. The material was extruded from the secondary extruder through an annular die and expanded polystyrene was formed as it was extruded. The extruded material was slit into sheet form, aged for about 3 days, and articles were thermoformed from the sheets. Scraps of foamed material left after the thermoforming operation, were fed into a recycle extruder, in which they were heated to about 500°-550° F., extruded, cooled and chopped into pellets.

The foamed sheet material and the reclaimed polystyrene, were tested for molecular weight in order to illustrate the effect of oxidative deterioration on the polymer system, as well as to provide a base for comparison with the effect of the process of the present invention. The molecular weight distribution was determined by gel permeation chromatography. This data is included below in Table 1.

EXAMPLE 2

Polystyrene was foam extruded as in Example 1, except that an antioxidant was introduced into the system in the following manner:

A solution of octadecyl 3-(3',5'-di-tert-butyl-4'-hydroxy phenyl)propionate in methylene chloride (12.5% by weight) was coinjected into the primary extruder with the blowing agent, isopentane. The injection of this solution was accomplished from a second storage reservoir through a high pressure pump and an appropriate metering system. The flow rate of this solution was controlled so as to yield 500 parts per million of the antioxidant in the foam sheet. Articles were made from the extruded sheet and polystyrene pellets were reclaimed from the scrap foam sheet material.

TABLE 1

| | STABILIZED (500 ppm antioxidant) $M_w$ | UNSTABILIZED $M_w$ |
|---|---|---|
| Virgin | 310,000 | 300,000 |
| Reclaim pellets | 280,000 | 250,000 |

The molecular weight figures shown opposite the term "VIRGIN" reveal that the molecular weight of the starting material for the two examples was different by approximately 3%. In other words, the virgin starting material of Examples 1 and 2 were slightly different. The material employed in Example 2 is identical to the material employed in Example 1 except that its molecular weight is approximately 3% higher. This different will be taken into considerating in examining the effectiveness of the subject process.

The unstabilized polystyrene of Example 1 showed a molecular weight decrease in the extruded sheet of approximately 21,000 or a drop of 7%. The molecular weight of the unstabilized reclaim pellets is approximately 50,000 less than the starting material or a decrease of about 16.5%. The molecular weight of the reclaimed pellets is approximately 280,000 or some 30,000 less than its stabilized starting material, which amounts to a decrease of approximately 10%.

These figures illustrate that the process of the present invention does in fact introduce the antioxidant material into the polystyrene system in a manner which permits the antioxidant to effectively inhibit the thermal oxidative degradation of the polymer. This degree of inhibition is of the same order as that observed in polystyrene containing the same antioxidant material but introduced by the supplier of the polymer. As indicated above, in a continuous process, the present invention will give the manufacturer a greater control over the amount of antioxidant and the kind of antioxidant introduced into the system at the time of foam sheet preparation.

The foregoing illustrates that not only an antioxidant, but any desired beneficial additive can be efficaciously introduced into a foamable polymer, just prior to reducing the temperature of the batch by transfer to the secondary extruder for sheet extrusion.

We claim:

1. A process for preparing a foamed styrene polymer composition which comprises:
   introducing a polymer charge comprising virgin styrene polymer, free of any antioxidant, into a first comparatively high temperature stage of an extruder and melting the same;
   dissolving an antioxidant into a liquid foaming agent;
   introducing the antioxidant-foaming agent solution to the molten polymer under pressure and intimately mixing the combination;
   transporting the molten polymer to a comparatively low temperature stage of the extruder; and extruding the molten polymer in foamed form.

2. The process of claim 1 wherein the antioxidant is present in an antioxidant effective proportion.

3. The process of claim 2 wherein the antioxidant is introduced in a range of from 10 to 1,000 parts per million parts of polymer.

4. The process of claim 3 wherein the antioxidant is a hindered phenol and said foaming agent is a member selected from the group consisting of a low molecular weight hydrocarbon, a chloro-fluoro carbon, methylene chloride, and mixtures thereof.

5. The process of claim 1 wherein said polymer charge includes reclaimed styrene polymer in non-foam form.

6. The process of claim 5 wherein the antioxidant is octadecyl 3-(3',5'-di-tert-butyl-4'-hydroxy phenyl)propionate and the foaming agent is methylene chloride or a mixture of the same with a low molecular weight hydrocarbon.

7. In the process for the preparation of polymer foam sheet comprising:
   melt blending a composition comprising virgin thermoplastic polymer, a nucleating agent and a volatile foaming agent,
   extruding said composition into a region of lower pressure to form a foamed sheet,
   thermoforming articles in said sheet,
   separating waste foam from said articles,
   reducing said waste to non-foam form, and
   recycling said non-foam waste in combination with said virgin polymer; the improvement which comprises,
   dissolving an additive material into the foaming agent while said foaming agent is in its liquid state, combining the thermoplastic polymer in its molten state with the additive-foaming agent solution in a comparatively high temperature stage of an extruder intimately mixing the combination, transporting said composition to a lower temperature stage of the extruder and extruding the composition in foamed sheet form.

8. The process of claim 7 wherein the virgin thermoplastic polymer is a member from the group consisting of polystyrene, polyparamethylstyrene, a blend of polystyrene and polyphenylene oxide, maleic anhydride/styrene copolymer and foamable polyolefins.

9. The process of claim 7 wherein said thermoplastic polymer is polystyrene.

* * * * *